R. H. ARNOLD.
Spindle Attachment for Vehicle Axletrees.
No. 210,742.　　　　　Patented Dec. 10, 1878.
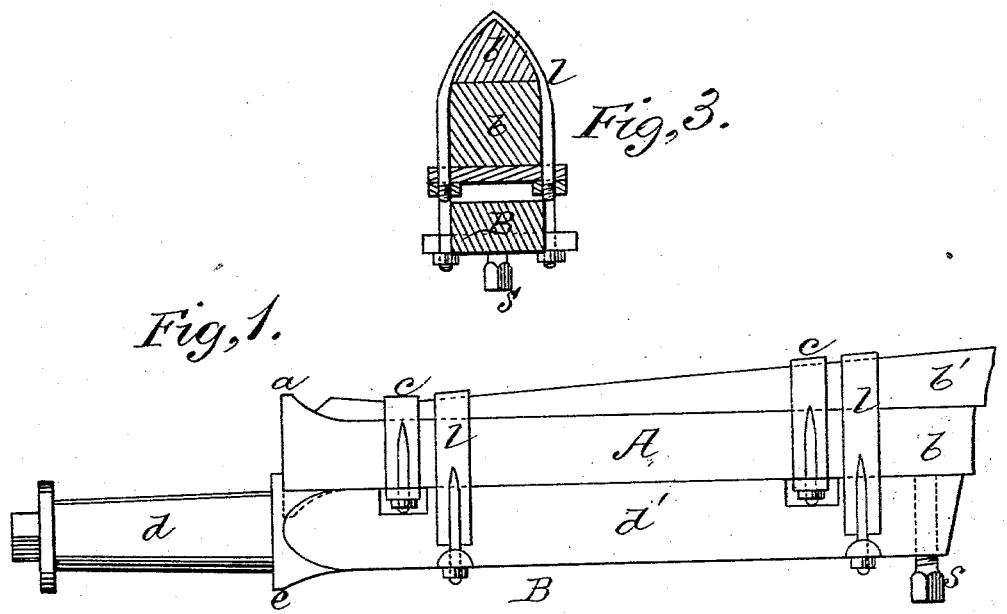
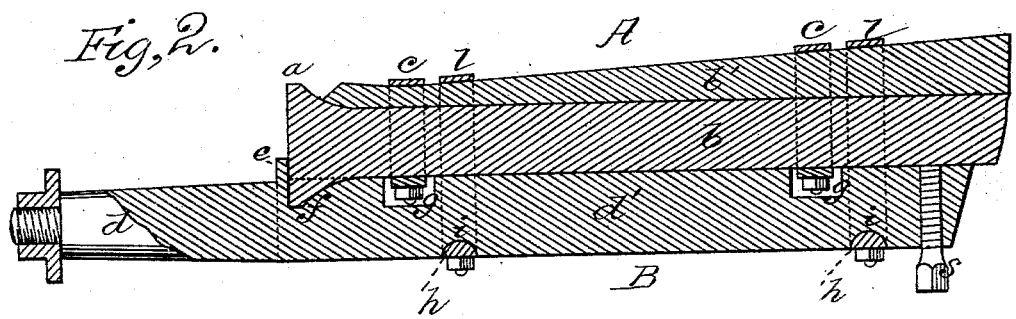

UNITED STATES PATENT OFFICE.

ROLLIN H. ARNOLD, OF HONEOYE, NEW YORK.

IMPROVEMENT IN SPINDLE ATTACHMENTS FOR VEHICLE AXLE-TREES.

Specification forming part of Letters Patent No. 210,742, dated December 10, 1878; application filed November 9, 1878.

To all whom it may concern:

Be it known that I, R. H. ARNOLD, of Honeoye, in the county of Ontario and State of New York, have invented a new and valuable Improvement in Spindle Attachments for Axle-Trees; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my invention. Fig. 2 is a longitudinal section of the same, and Fig. 3 is a transverse section thereof.

This invention has relation to improvements in vehicle-axles.

The object of the invention is to devise a safe and expeditious means for splicing an axle-arm to the end of the axle of a vehicle in the event of its own arm breaking off.

The nature of the invention consists in combining, with an axle-stump, a subsidiary axle-arm, having in its upper face recesses for the reception of the followers of the axle-clips and the end shoulder of the axle, the said arm being secured to the axle by means of clips and a rear leveling-screw passing through a threaded seat in the body of said arm, as will be hereinafter more fully set forth.

In the annexed drawings, the letter A designates an ordinary iron axle-tree, whose spindle is wanting, the same having been broken short off at the shoulder $a$. The iron and wooden portions $b$ $b'$ are coupled together by means of clips $c$, in the usual manner. B indicates the subsidiary axle-arm, composed of a spindle, $d$, and a body, $d'$, separated from each other by a collar, $e$. This axle-arm has inside of its collar a recess, $f$, in which the collar $a$ of the axle-stump is received, and in its body $d$ two or more recesses, $g$, in which the followers and nuts of the clips $c$ are received, as shown in Fig. 2, the object of this construction being to bring the contiguous plane faces of the axle-stump and subsidiary arm closely together and form a stable bearing. In the under side of the body of this arm are formed two or more transverse semi-cylindrical grooves, $i$, that receive the correspondingly-shaped followers $h$ of string-clips $l$. These clips embrace both the axle-stump and subsidiary axle-arm, and when the nuts are set up forcibly clamp them together.

The shoulder of the stump being engaged in the recess $f$ of the axle-arm and its clips $c$ in the recesses $g$ thereof, the latter is incapable of endwise displacement relative to the axle.

If I so elect, instead of having two recesses, $g$, in the body of the axle-arm, I may use a single recess, covering the space between the said two recesses, so that whatever be the position of the clips $c$ on the axle-stump, room will always be found to receive the said clips, and allow the surfaces of the arm and stump to come snugly together.

Sometimes the body of the axle-stump is arched, and its extremity is at an inclination to the horizontal plane; hence, to render the subsidiary axle-arm operative and the wheel vertical, I employ a leveling-screw, $s$, passing through a threaded seat in the inner end of the body of said arm, which, previous to the forcible application of clips $l$, is screwed up until the said arm is horizontal. The clips are then forcibly attached and the arm rigidly secured to the stump, as before.

The convenience and utility of this device will be readily appreciated if the trouble, labor, and time required to prop up a broken-down vehicle on a road, at a place distant from a shop, be taken into consideration.

By simply attaching the subsidiary arm to the axle-stump, as above stated, which will require no mechanical skill beyond that possessed by a driver of ordinary intelligence, and cause but little loss of time, the vehicle is put in good order for traveling.

What I claim as new, and desire to secure by Letters Patent, is—

The spindle attachment for axle-trees, consisting of the iron axle-stump A, having a shoulder, $a$, and clips $c$, a subsidiary axle-arm, B, having in its body the recesses $f$ $g$, designed to receive said shoulder and clips, respectively, the raised flange $e$, abutting against the shoulder $a$, the clips $l$ $l$, embracing both the arm and stump and clamping them together, and the rear leveling-screw, S, substantially as specified.

In testimony that I claim the above I have hereunto subscribed my name in the presence of two witnesses.

ROLLIN H. ARNOLD.

Witnesses:
 JAMES SOUTHGATE,
 SAML. B. SMITH.